US011714243B2

(12) United States Patent
Lin et al.

(10) Patent No.: US 11,714,243 B2
(45) Date of Patent: Aug. 1, 2023

(54) DEVICE FOR COMMUNICATION

(71) Applicant: Advanced Semiconductor Engineering, Inc., Kaohsiung (TW)

(72) Inventors: Jr-Wei Lin, Kaohsiung (TW); Sin-Yuan Mu, Kaohsiung (TW); Mei-Ju Lu, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 130 days.

(21) Appl. No.: 17/127,666

(22) Filed: Dec. 18, 2020

(65) Prior Publication Data

US 2022/0196934 A1  Jun. 23, 2022

(51) Int. Cl.
| | |
|---|---|
| *G02B 6/42* | (2006.01) |
| *G02B 6/30* | (2006.01) |
| *G02B 6/34* | (2006.01) |
| *G02B 6/122* | (2006.01) |
| *G02B 6/13* | (2006.01) |
| *G02B 6/36* | (2006.01) |
| *G02B 6/132* | (2006.01) |
| *G02B 6/124* | (2006.01) |

(52) U.S. Cl.
CPC .......... *G02B 6/4212* (2013.01); *G02B 6/122* (2013.01); *G02B 6/124* (2013.01); *G02B 6/13* (2013.01); *G02B 6/132* (2013.01); *G02B 6/30* (2013.01); *G02B 6/34* (2013.01); *G02B 6/3628* (2013.01); *G02B 6/42* (2013.01)

(58) Field of Classification Search
CPC ........ G02B 6/4212; G02B 6/30; G02B 6/262; G02B 6/3652; G02B 6/4239; G02B 6/3628; G02B 6/132; G02B 6/34; G02B 6/124; G02B 6/13; G02B 6/122; G02B 6/4206
See application file for complete search history.

(56) References Cited

U.S. PATENT DOCUMENTS

| | | | | | |
|---|---|---|---|---|---|
| 4,877,300 | A | * | 10/1989 | Newhouse | G02B 6/262 385/43 |
| 5,208,882 | A | * | 5/1993 | Strasser | G02B 6/34 385/37 |
| 8,724,937 | B2 | * | 5/2014 | Barwicz | G02B 6/30 385/14 |
| 9,983,355 | B1 | * | 5/2018 | Davis | G02B 6/35 |

(Continued)

OTHER PUBLICATIONS

Jing, Zhang et al., "Taper Couplers for Coupling Between Laser and Silicon Waveguide With Large Allowable Tolerance", Proceedings of SPIE—The International Society for Optical Engineering, Feb. 2008, 8 pages.

(Continued)

*Primary Examiner* — Ryan A Lepisto
*Assistant Examiner* — Erin D Chiem
(74) *Attorney, Agent, or Firm* — Foley & Lardner LLP

(57) ABSTRACT

A device is provided. The device may be an optical device, a light coupling device, or a device containing an optical structure. The device includes a waveguide, a cladding, and a light coupling material. The light coupling material is disposed adjacent to the waveguide and has a first surface and a second surface, where the second surface is disposed further away from the waveguide than the first surface and a thickness of the second surface is greater than that of the first surface.

15 Claims, 15 Drawing Sheets

(56) References Cited

U.S. PATENT DOCUMENTS

| | | | |
|---|---|---|---|
| 10,459,160 B2* | 10/2019 | Brusberg | ............... G02B 6/122 |
| 11,035,993 B2* | 6/2021 | Vasylyev | ............. G02B 6/0068 |
| 2011/0255824 A1* | 10/2011 | Lee | ...................... G02B 6/1228 |
| | | | 264/1.25 |
| 2021/0311258 A1* | 10/2021 | Frish | ........................ G02B 6/13 |

OTHER PUBLICATIONS

Mu, Xin et al., "Edge Couplers in Silicon Photonic Integrated Circuits: A Review", Feb. 24, 2020, Appl. Sci. 2020, 10 1538. 29 pages.

\* cited by examiner

DEVICE FOR COMMUNICATION

BACKGROUND

1. Technical Field

The present disclosure relates to a device and, more particularly, to a device including an optical structure for communication.

2. Description of the Related Art

Optical gratings are frequently used to facilitate communication between light sources and other components (e.g., photodetectors). For example, optical gratings can be used to redirect light from an optical fiber into an optical detector. Light coupled from one end of the optical gratings may travel transversely through the optical gratings by reflecting off the inner surfaces at shallow angles. The traveling light then may be redirected so that it strikes the inner surfaces at a sharper angle that is greater than the critical angle of incidence, thus allowing the redirected light to escape from the other end of the optical gratings. After escaping, the light may impinge upon a detector. The detected light may then be used for various purposes, such as to receive an encoded communications signal that was transmitted through the optical gratings. Unfortunately, this process, as well as a reverse process in which optical gratings are used to redirect light from an on-chip light source to an optical fiber, may exhibit poor coupling efficiency, with a large part of the redirected light not reaching the detector. There exists a need to develop a device of efficient optical coupling using optical gratings.

SUMMARY

In an aspect, a device includes a waveguide, a cladding, and a light coupling material. The light coupling material is disposed adjacent to the waveguide and has a first surface and a second surface, where the second surface is disposed further away from the waveguide than the first surface and a thickness of the second surface is greater than that of the first surface.

In an aspect, a device includes a waveguide and a light coupling material. The light coupling material is disposed adjacent to the waveguide and so configured that light traveling through the light coupling material and toward the waveguide converges in a thickness-wise direction of the waveguide into the waveguide.

DETAILED DESCRIPTION

Spatial descriptions, such as "above," "top," and "bottom" and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated by such arrangement.

In some embodiments, the present disclosure provides a device including a waveguide, a cladding, and a light coupling material. The light coupling material and the cladding are so configured in the device that light is directed toward the waveguide in such a manner that the light coupling efficiency is improved.

Figure 1:
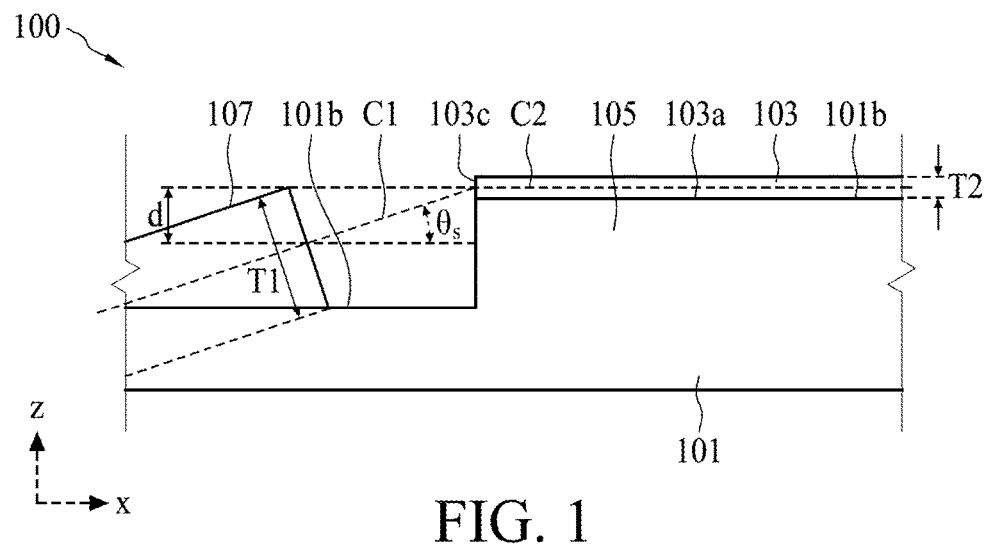
FIG. 1 illustrates a cross-sectional view of an example device according to an embodiment of the present disclosure.

FIG. 1 illustrates a cross-sectional view of a device 100 according to an embodiment of the present disclosure. The device 100 of FIG. 1 may be an optical device, a light coupling device, or a device including an optical structure. The device 100 may include an optical structure so the light passing through it may emit toward a certain direction. For example, the device 100 may include an optical structure configured so that light passing through it may emit along a horizontal direction (e.g., edge coupling). Additionally or alternatively, the device 100 may include an optical structure configured so that light passing through it may emit along a vertical direction (e.g., grating coupling). The device 100 may include a waveguide 103 and a light emitting element 107.

The waveguide 103 may be used to transmit light toward a certain direction or toward a light detector. Depending on the application, the waveguide 103 may be used to direct the light from different directions toward the same horizontal direction or toward the same vertical direction. In the device 100, the waveguide 103 may be disposed adjacent to a surface 101a of a substrate 101. The waveguide 103 may be disposed adjacent to a protrusion or step portion 105 of the substrate 101. In some embodiments, the waveguide 103 is disposed on a protrusion portion 105 of the substrate 101 by an adhesive.

The light emitting element 107 aims to provide light to the waveguide 103 so it should correspond to the waveguide 103 in position and should be as close as possible to the waveguide 103 so the coupling efficiency may be optimized. The light emitting element 107 should be disposed at a position so that light emitted from the light emitting element 107 may enter the waveguide 103. In some embodiments, the light emitting element 107 is so disposed that a central axis C1 of the light emitting element 107 extends through a side surface 103c of the waveguide 103. Preferably, the light emitting element 107 should be so disposed that the central axis C1 of the light emitting element 107 aligns with a central axis C2 of the waveguide 103 whereby light may enter the waveguide 103 more directly and the light coupling efficiency of the device 100 may be optimized.

Nevertheless, there is a continuing demand to reduce (i.e. miniaturize) the size of the light emitting element 107 (e.g., about 10 μm in beam size) and the waveguide 103 (e.g., about 1 μm in thickness) in a semiconductor device (e.g., a silicon photonic device). Meanwhile, the size (e.g., the thickness T1) of the light emitting element 107 is much greater than the size (e.g., the thickness T2) of the waveguide 103 (may be ten times greater). As such, it is extremely difficult to precisely control the relative position of the light emitting element 107 to the waveguide 103 and to dispose the light emitting element 107 at the appropriate position while also disposing it as close as possible to the waveguide 103. For example, in some embodiments, such as those illustrated in FIG. 1, the light emitting element 107 may not be able to be disposed upright from a surface 101b of the substrate 101 and having a central axis C1 in parallel with central axis C2 of the waveguide 103. Rather, the central axis C1 may be misaligned with respect to a bottom surface 103a of the waveguide 103 by an angle θs (rotation offset) and a vertical offset d. Such misalignments are the reasons why the light coupling efficiency is low; i.e., the light emitted from the light emitting element 107 is shifted by the location shift of the light emitting element 107 and less light may thus enter the waveguide 103 effectively. Tremendous amounts of time and complicated processes may be required to relocate the light emitting element 107 so as to reduce such misalignments and improve the light coupling efficiency.

Given the above and other reasons, it would be desirable to provide a device that can improve light coupling efficiency and at the same time satisfy the miniaturization requirement.

Figure 2A:
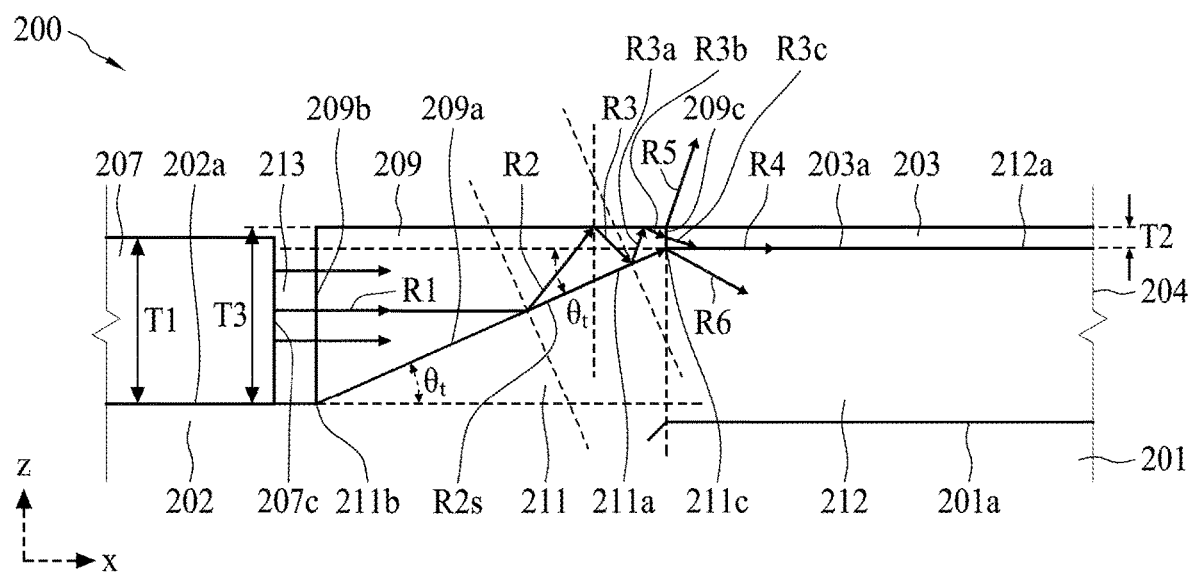
FIG. 2(a) illustrates a cross-sectional view of an example device along an x-axis direction according to an embodiment of the present disclosure.

FIG. 2(a) illustrates a cross-sectional view of a device 200 along an x-axis direction according to an embodiment of the present disclosure. The device 200 of FIG. 2 may be an optical device, a light coupling device, or a device including an optical structure. The device 200 may include an optical structure configured such that the light passing through it may emit toward a certain direction. For example, the device 200 may include an optical structure configured so that light passing through it may emit along a horizontal direction (e.g., edge coupling). On the other hand, the device 200 may include an optical structure configured so that light passing through it may emit along a vertical direction (e.g., grating coupling). The device 200 may include a cladding 204, a waveguide 203, and a light coupling material 209.

The cladding 204 may be so configured that when light R1 reaches a surface 211a of the cladding 204, more of light R1 may reflect and toward the waveguide 203 (e.g., total internally reflected light through R1→R2→R3→R3a→R3b→R3c→R4 and transmitted light by total reflection though R1→R2s→R4) and less light may escape from the waveguide 203, because, for example, it tends to more effectively reach the edges of the side surface 209c of the waveguide 203 and scatter (e.g., R5, R6), reflect, or refract less. The cladding 204 is disposed adjacent to a surface 201a of the substrate 201. The cladding 204 may be conformed to the shape of the surface 201a of the substrate 201. The cladding 204 may be used to support the light coupling material 209, the waveguide 203, and/or a light emitting element 207. The cladding 204 may include a first portion 212, a second portion 211, and a third portion 202. The first portion 212 of the cladding 204 may be used to support the waveguide 203. The second portion 211 may be so configured to guide light toward the waveguide 203. The third portion 202 of the cladding 204 may be used to support a light emitting element 207.

The first portion 212 may be disposed adjacent to the surface 201a of the substrate 201. The first portion 212 may have a material the same or different from that of the substrate 201. The first portion 212 may be integrally formed with the substrate 201. The first portion 212 may include a material having a refractive index that is smaller than that of the light coupling material 209 and that of the waveguide 203. The first portion 212 may include a material having a refractive index between about 1.0 to about 2.0. The first portion 212 may include a material having a refractive index about 1.0, about 1.05, about 1.10, about 1.15, about 1.20, about 1.25, about 1.30, about 1.35, about 1.40, about 1.45, about 1.50, about 1.55, about 1.60, about 1.65, about 1.70, about 1.75, about 1.80, about 1.85, about 1.90, about 1.95, and about 2.0. In some embodiments, the first portion 212 includes a material having a refractive index about 1.45. The first portion 212 may include, for example, an oxide, silicon oxide, or other suitable materials. In some embodiments, the first portion 212 includes silicon oxide.

The second portion 211 may be so configured that when light R1 reaches a surface 211a of the second portion 211 of the cladding 204, more of light R1 may reflect and toward the waveguide 203 (e.g., total internally reflected light through R1→R2→R3→R3a→R3b→R3c→R4 and transmitted light by total reflection though R1→R2s→R4) and less light may escape from the waveguide 203, because, for example, it tends to more effectively reach the edges of the side surface 209c of the waveguide 203 and scatter (R5, R6), reflect, or refract less.

The second portion 211 may have a first side 211c and a second side 211b. The second side 211b is disposed farther away from the waveguide 203 than the first side 211c. A thickness of the second portion 211 may substantially increase from the second side 211b to the first side 211c. The second portion 211 may have a slope surface 211a having an angle θt with respect to a line defined by and extending from the top surface 212a of the first portion 212 of the cladding 204 (or a bottom surface 203a of the waveguide 203). The second portion 211 may have a taper angle θt defined by the slope surface 211a with respect to an imaginary extended line of the top surface 212a of the first portion 212 of the cladding 204 (or a bottom surface 203a of the waveguide 203). The taper angle θt may be so selected that when light R1 reaches the slope surface 211a of the second portion 211 of the cladding 204, more light R1 may reflect and toward the waveguide 203 (e.g., total internally reflected light through R1→R2→R3→R3a→R3b→R3c→R4 and transmitted light by total reflection though R1→R2s→R4) and less light may escape from the waveguide 203, because, for example, it tends to more effectively reach the edges of the side surface 209c of the waveguide 203 and scatter (R5, R6), reflect, or refract less. The taper angle θt may be about 5° to 15°. The taper angle θt may be about 5°, 6°, 7°, 8°, 9°, 10°, 11°, 12°, 13°, 14°, or 15°. In some embodiments, the taper angle θt is about 10°.

The second portion 211 may be disposed adjacent to the first portion 212 of the cladding 204. The second portion 211 may be in contact with the waveguide 203. The second portion 211 may be spaced from the first portion 212 by a distance. Alternatively, the second portion 211 may connect to the first portion 212. In some embodiments, the second portion 211 is integrally formed with the first portion 212. The second portion 211 may be disposed adjacent to the surface 201a of the substrate 201. The second portion 211 may have a material the same or different from that of the substrate 201. The second portion 211 may be integrally formed with the substrate 201. In some embodiments, the second portion 211 is integrally formed with the first portion 212. The second portion 211 may include a material having a refractive index $n_2$ that is smaller than that of the light coupling material 209 and/or that of the waveguide 203. The second portion 211 may include a material having a refractive index between about 1.0 to about 2.0. The second portion 211 may include a material having a refractive index about 1.0, about 1.05, about 1.10, about 1.15, about 1.20, about 1.25, about 1.30, about 1.35, about 1.40, about 1.45, about 1.50, about 1.55, about 1.60, about 1.65, about 1.70, about 1.75, about 1.80, about 1.85, about 1.90, about 1.95, and about 2.0. In some embodiments, the second portion 211 includes a material having a refractive index about 1.45. The second portion 211 may include, for example, an oxide, silicon oxide, or other suitable materials. In some embodiments, the second portion 211 includes silicon oxide.

The third portion 202 of the cladding 204 may be used to support a light emitting element 207. The third portion 202 may be disposed adjacent to the second portion 211 of the cladding 204. The third portion 202 may be spaced from the second portion 211 by a distance. Alternatively, the third portion 202 may connect to the second portion 211. In some embodiments, the third portion 202 is integrally formed with the second portion 211. The third portion 202 may be disposed adjacent to the surface 201a of the substrate 201. The third portion 202 may have a material the same or different from that of the substrate 201. The third portion 202 may be integrally formed with the substrate 201. In some embodiments, the third portion 202 is integrally formed with the second portion 211. In some embodiments, the third portion 202 is integrally formed with the second portion 211 and the first portion 212. The third portion 202 may include a material having a refractive index between about 1.0 to about 2.0. The third portion 202 may include a material having a refractive index about 1.0, about 1.05, about 1.10, about 1.15, about 1.20, about 1.25, about 1.30, about 1.35, about 1.40, about 1.45, about 1.50, about 1.55, about 1.60, about 1.65, about 1.70, about 1.75, about 1.80, about 1.85, about 1.90, about 1.95, and about 2.0. In some embodiments, the third portion 202 includes a material having a refractive index about 1.45. The third portion 202 may include, for example, an oxide, silicon oxide, or other suitable materials. In some embodiments, the third portion 202 includes silicon oxide.

By disposing the cladding 204 to have a slope portion before the waveguide 203, when light R1 reaches the slope surface 211a of the cladding 204, more of light R1 may reflect and toward the waveguide 203 (e.g., total internally reflected light through R1→R2→R3→R3a→R3b→R3c→R4 and transmitted light by total reflection though R1→R2s→R4) and less light may escape from the waveguide 203, because, for example, it tends to more effectively reach the edges of the side surface 209c of the waveguide 203 and scatter (e.g., R5, R6), reflect, or refract less, which can improve the light coupling efficiency.

The waveguide 203 may be so configured to transmit light toward a certain direction or toward a light detector. Depending on a particular application, the waveguide 203 may be so configured to direct light from different directions toward the same horizontal direction or toward the same vertical direction. The waveguide 203 may be disposed adjacent to a surface of the cladding 204. The waveguide 203 may be disposed adjacent to the top surface 212a of the first portion 212 of the cladding 204. In some embodiments, the waveguide 203 is disposed on (e.g., direct contact) the top surface 212a of the first portion 212 of the cladding 204. The waveguide 203 may include a material having a refractive index $n_1$ that is greater than that of the light coupling material 209 and/or that of the waveguide 203. The waveguide 203 may include a material having a refractive index $n_1$ between about 3.10 and about 3.75. The waveguide 203 may include a material having a refractive index $n_1$ about 3.10, about 3.15, about 3.20, about 3.25, about 3.30, about 3.35, about 3.40, about 3.45, about 3.50, about 3.55, about 3.60, about 3.65, about 3.70, and about 3.75. In some embodiments, the waveguide 203 includes a material having a refractive index $n_1$ about 3.45. The waveguide 203 may include, for example, silicon, or other suitable materials. In some embodiments, the waveguide 203 includes silicon. The waveguide 203 may have a thickness of about 0.5 μm to about 1.5 μm. A thickness of the waveguide 203 may be about 0.5 μm, about 0.6 μm, about 0.7 μm, about 0.8 μm, about 0.9 μm, about 1.0 μm, about 1.1 μm, about 1.2 μm, about 1.3 μm, about 1.4 μm, and about 1.5 μm. In some embodiments, a thickness of the waveguide 203 is about 1.0 μm.

The light coupling material 209 may be so configured that light entering it may converge in a thickness-wise direction of the waveguide 203 into the waveguide 203. The light coupling material 209 may have a shape configured to direct the light toward the waveguide 203. The light coupling material 209 may be disposed adjacent to the waveguide 203. The light coupling material 209 may be disposed adjacent to the cladding 204. The light coupling material 209 may be disposed on a surface 211a of the cladding 204 and be in contact with the waveguide 203. In some embodiments, the light coupling material 209 is disposed on the slope surface 211a of the second portion 211 of the cladding 204 and in contact with the waveguide 203.

The light coupling material 209 may have a first surface 209c and a second surface 209b. The second surface 209b may be disposed farther away from the waveguide 203 than the first surface 209c. A thickness of the second surface 209b may be greater than that of the first surface 209c. A thickness of the light coupling material 209 may substantially decrease from the second surface 209b toward the first surface 209c. The light coupling material 209 may have a slope surface 209a having an angle θt with respect to a line defined by and extending from the top surface 212a of the first portion 212 of the cladding 204 (or a bottom surface 203a of the waveguide 203). The light coupling material 209 may have a taper angle θt defined by the slope surface 209a with respect to a line defined by and extending from the top surface 212a of the first portion 212 of the cladding 204 (or a bottom surface 203a of the waveguide 203). The taper angle θt may be so selected that when light R1 reaches the slope surface 211a of the second portion 211 of the cladding 204, more of light R1 may reflect and toward the waveguide 203 (e.g., total internally reflected light through R1→R2→R3→R3a→R3b→R3c→R4 and transmitted light by total reflection though R1→R2s→R4) and less light may escape from the waveguide 203, because, for example, it may tend to more effectively reach the edges of the side surface 209c of the waveguide 203 and scatter (e.g., R5, R6), reflect, or refract less. The taper angle θt may be about 5° to 15°. The taper angle θt may be about 5°, 6°, 7°, 8°, 9°, 10°, 11°, 12°, 13°, 14°, or 15°. In some embodiments, the taper angle θt is about 10°. If the taper angle θt is greater than about 15°, light transmitted along the slope surface 209a may scatter, reflect, or refract at the edges of the side surface 209c of the waveguide 203 into the cladding 204 (e.g., R6) and air (e.g., R5) and decrease the light coupling efficiency.

The light coupling material 209 may thus be tapered in a direction toward the waveguide 203. The light coupling material 209 may include a material having a refractive index $n_3$ that is smaller than that of the material of the waveguide 203 and/or is greater than that of the material of the cladding 204 (i.e., $n_1 > n_3 > n_2$). According to an aspect, so long as an incident angle of the light on the interface 209a between the light coupling material 209 and the cladding 204 is greater than the critical angle of the interface 209a, more of the light will enter the waveguide 203 along the interface 209a and less of the light will enter the cladding 204, with the combined result being that the light coupling efficiency may be further improved. The light coupling material 209 may include a material having a refractive index $n_3$ between about 2 and about 2.5. The refractive index $n_3$ may be about 2, about 2.1, about 2.2, about 2.3, about 2.4, or about 2.5. In some embodiments, the light coupling material 209 includes a material having a refractive index $n_3$ about 2.2. The light coupling material 209 may include one of $TiO_2$, resin, other suitable materials, or a combination thereof. In some embodiments, the light coupling material 209 includes $TiO_2$. The light coupling material 209 may be homogenous or is integrally formed.

By disposing a light coupling material 209 between the light emitting element 207 and the waveguide 203 that has a thickness decreasing upwardly toward the waveguide 203, the light emitting from the light emitting element 207 may be more effectively directed upward to the waveguide 203 and be caused to converge more effectively toward the waveguide in z-direction. For example, more of light R1 may reflect and be directed toward the waveguide 203 (e.g., total internally reflected light through R1→R2→R3→R3a→R3b→R3c→R4 and transmitted light by total reflection though R1→R2s→R4) and less light may reach the edge of the side surface 209c of the waveguide 203 and scatter (e.g., R5, R6) or refract, which can improve the light coupling efficiency.

Figure 2B:
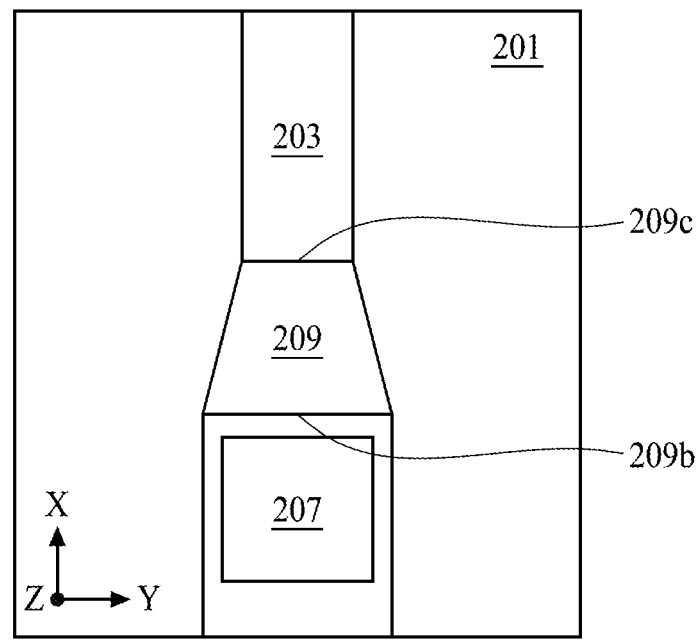
FIG. 2(b) illustrates a top view of the device of FIG. 2(a) according to an embodiment of the present disclosure.
Figure 2C:
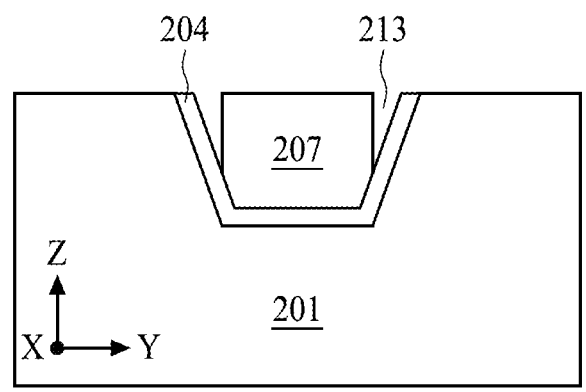
FIG. 2(c) illustrates a cross-sectional view of the device of FIG. 2(a) along a y-axis direction according to an embodiment of the present disclosure.

In some embodiments, such as the example illustrated in FIG. 2(a)-2(c), the device 200 may further include a light emitting element 207. The light emitting element 207 may be disposed adjacent to the light coupling material 209. The light emitting element 207 may be disposed adjacent to the surface 202a of the cladding 204. In some embodiments, the light emitting element 207 is supported by the third portion 202 of the cladding 204. A central axis of a light emitting surface 207c of the light emitting element 207 may extend outside a surface of the waveguide 203 that faces the light coupling material 209. For example, with reference to the example of FIG. 2(a), the central axis of the light emitting surface 207c may roughly correspond to the ray R1 emitting therefrom, and this central axis extends outside the boundaries of (i.e. does not intersect with) a surface of waveguide 203 adjacent to surface 209c of light coupling material 209. In some embodiments, such as the example illustrated in FIG. 2(a)-2(c), the light emitting element 207 may be so disposed that a central axis of it is not tilted with respect to the bottom surface 103a of the waveguide 103. A thickness T1 of the light emitting element 207 may be smaller than a thickness T3 of the second surface 209b of the light coupling material 209 in a thickness-wise direction of the waveguide 203 so that most of the light emitted from the light emitting element 207 can be captured by the light coupling material 209. As a result, the light coupling efficiency may be further improved. The light emitting element 207 may emit light having a beam size between about 7 μm to about 13 μm. A beam size of the light emitted from the light emitting element 207 may be about 7 μm, about 7.5 μm, about 8.0 μm, about 8.5 μm, about 9.0 μm, about 9.5 μm, about 10.0 μm, about 10.5 μm, about 11.0 μm, about 11.5 μm, about 12.0 μm, about 12.5 μm, and about 13.0 μm. In some embodiments, a beam size of the light emitted from the light emitting element 207 is about 10.0 μm.

FIG. 2(b) illustrates a top view of the device 200 according to an embodiment of the present disclosure. As shown in FIG. 2(b), the light coupling material 209 may be further configured so that light entering it may converge in a width-wise direction (e.g., y-axis direction) of the waveguide 203 into the waveguide 203. For example, a width of the light coupling material 209 may substantially decrease from the second surface 209b toward the first surface 209c of the light coupling material 209.

FIG. 2(c) illustrates a cross-sectional view of the device 200 along a y-axis direction according to an embodiment of the present disclosure. As shown in FIG. 2(c), the light emitting element 207 may be disposed in a trench 213 on the cladding 204 so the movement of the light emitting element 207 in a y-axis direction may be restricted and the placement of the light emitting element 207 can be controlled more precisely. The trench 213 may also be disposed on the substrate 201. The trench 213 may have an inverted trapezoid shape or a V-shape from the cross-sectional view. In some embodiments, the trench 213 has a V-shape from the cross-sectional view to increase the holding effects.

Figure 3:
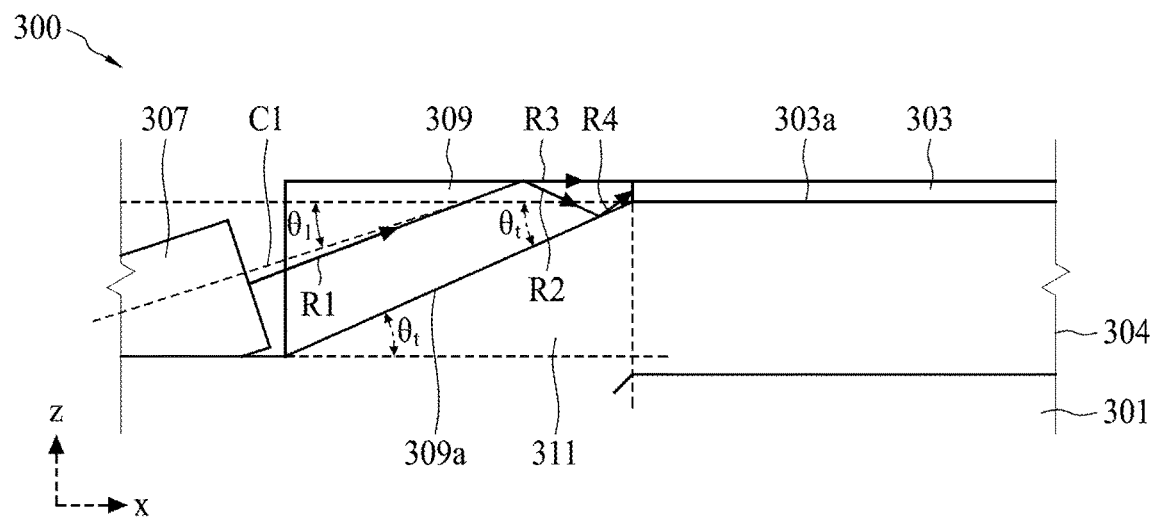
FIG. 3 illustrates a cross-sectional view of an example device according to an embodiment of the present disclosure.

FIG. 3 illustrates a cross-sectional view of a device 300 according to an embodiment of the present disclosure. The semiconductor package 300 is similar to that illustrated in FIG. 2(a), with a difference including that a central axis C1 of the light emitting element 307 may be tilted by an angle θ1 with respect to a line defined by and extending from the bottom surface 303a of the waveguide 303. In this example, when the angle θ1 is positive, it may indicate that the central axis C1 of the light emitting element 307 is tilted upwardly with respect to the waveguide 303. On the other hand, when the angle θ1 is negative, it may indicate that the central axis C1 of the light emitting element 307 is tilted downwardly with respect to the waveguide 303. Although the light emitting element 307 is tilted, the light R1 emitted from the light emitting element 307 can still enter the waveguide 303 effectively (e.g., total internally reflected light through R1→R2→R4 and surface light (transmitted light under total reflection through R1→R3)) by disposing the light coupling material 309 and the cladding 304 as stated above. Therefore, under the circumstances that the light emitting element 307 is not placed precisely, such misalignment may not affect the light coupling efficiency. In addition, since the process window for placing the light emitting element 307 at a predetermined exact position may be increased by such configurations, the calibration processes for precisely placing the light emitting element 307 may be facilitated or simplified, which may improve the process time and improve the throughput of the device.

Figure 4:
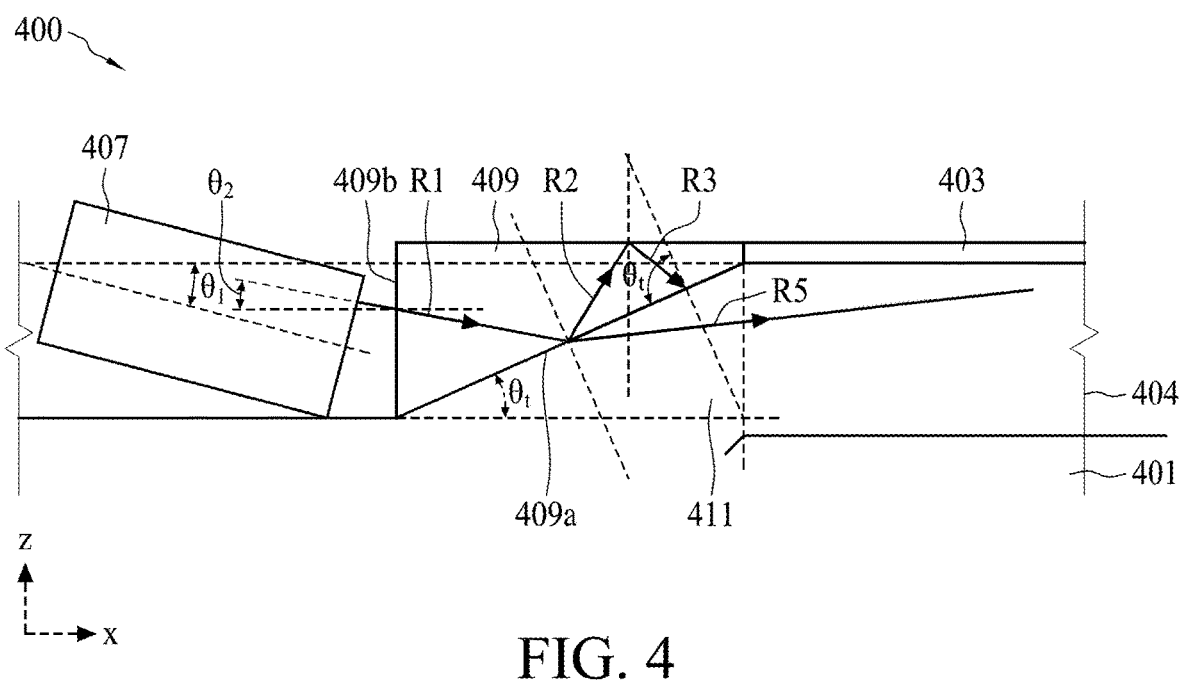
FIG. 4 illustrates a cross-sectional view of an example device according to an embodiment of the present disclosure.

FIG. 4 illustrates a cross-sectional view of a device 400 according to an embodiment of the present disclosure. The semiconductor package 400 is similar to that illustrated in FIG. 3, with a difference including that the angle θ1 is negative and the central axis C1 of the light emitting element 407 is tilted downwardly with respect to the waveguide 403. As stated above, the adverse effects otherwise caused by such tilt may be eliminated by disposing the light coupling material 409 and the cladding 404 as disclosed above. Accordingly, the light R1 emitted from the tilted light emitting element 407 can still enter the waveguide 403 effectively (e.g., reflected light through R1→R2→R3). In addition, the cladding 404 disposed adjacent to the light coupling material 409 may be so configured that total internal reflection occurs when the light is incident upon an interface 409a at which the light coupling material 409 and the second portion 411 of the cladding 404 connect, where an incident angle θ2 of the light on a light receiving surface 409b of the light coupling material 409, the taper angle θt, the refractive index $n_3$ of the light coupling material 409, and the refractive index $n_2$ of the cladding 404 may satisfy $n_3 * \cos(3\theta t + \theta 2) > n_2$.

Figure 5:
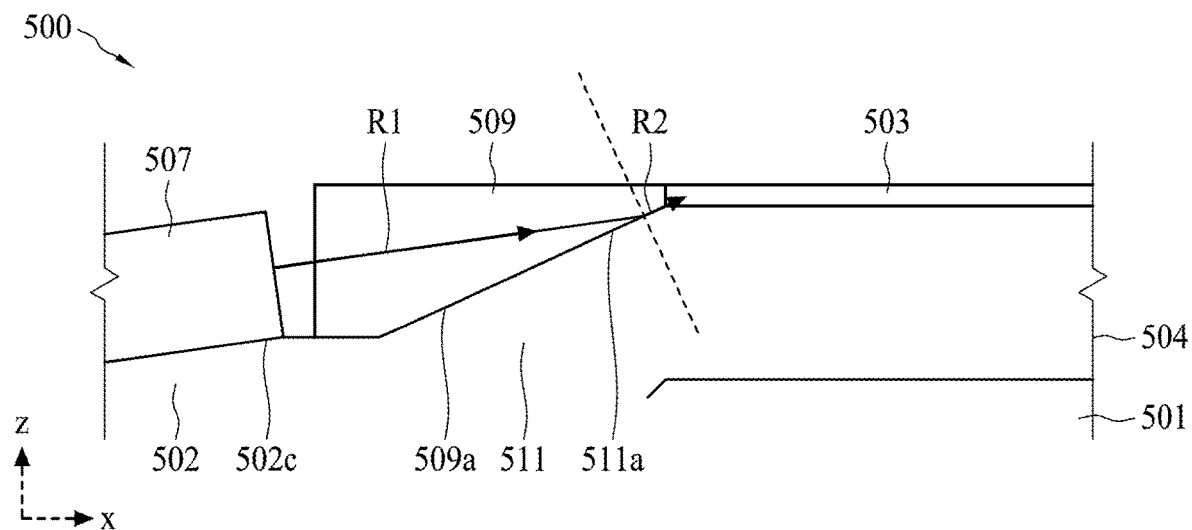
FIG. 5 illustrates a cross-sectional view of an example device according to an embodiment of the present disclosure.

FIG. 5 illustrates a cross-sectional view of a device 500 according to an embodiment of the present disclosure. The semiconductor package 500 is similar to that illustrated in FIG. 2(a), with a difference including that the third portion 502 of the cladding 504 supporting the light emitting element 507 may have a slope surface 502c, thereby causing element 507 to tilt similarly as illustrated in FIG. 3. Those skilled in the art will understand how the light R1 emitted from element 507 and angled as caused by such structural configuration may still enter the waveguide 503 by disposing the light coupling material 509 and the cladding 504 as disclosed above.

Figure 6:
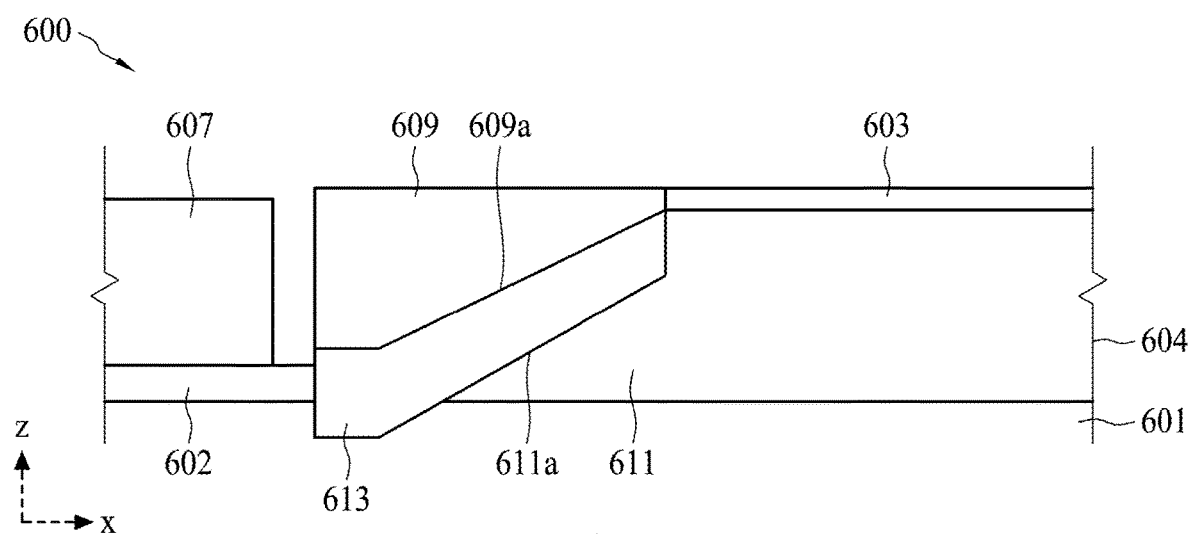
FIG. 6 illustrates a cross-sectional view of an example device according to an embodiment of the present disclosure.

FIG. 6 illustrates a cross-sectional view of a device 600 according to an embodiment of the present disclosure. The semiconductor package 600 is similar to that illustrated in FIG. 2(a), with a difference including that there is a gap 613 between the slope surface 609a of the light coupling material 609 and the slope surface 611a of the second portion 611 of the cladding 604. The gap 613 may surround the light coupling material 609. The light coupling material 609 may be separated from the cladding 604 by the gap 613. The gap 613 may be filled with air or other materials having suitable refractive index that may reduce the refraction at the interface 609a. The gap 613 may further improve the light coupling efficiency by selecting the refractive index of the filling material appropriately. In some embodiments, the gap 613 is an air gap.

Figure 7A:
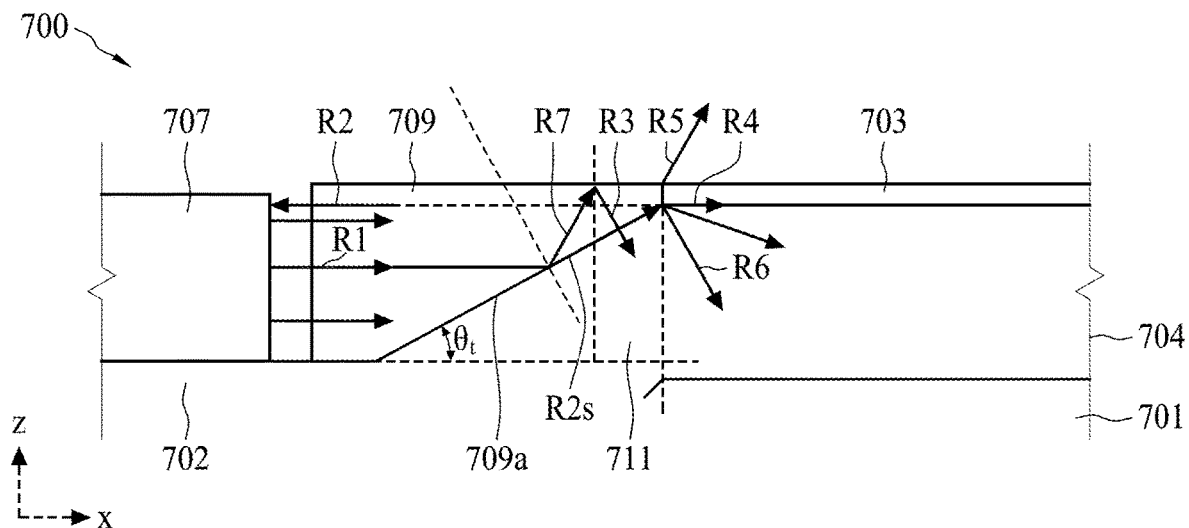
FIG. 7(a) illustrates a cross-sectional view of an example device according to an embodiment of the present disclosure.

FIG. 7(a) illustrates a cross-sectional view of a device 700 according to an embodiment of the present disclosure. The semiconductor package 700 is similar to that illustrated in FIG. 2(a), with a difference including that the taper angle θt of the second portion 711 of the cladding 704 and the refractive index $n_3$ of the light coupling material 709 may be different from the taper angle θt of the second portion 211 of the cladding 204 and the refractive index $n_3$ of the light coupling material 209 of the device of FIG. 2(a), respectively. In some embodiments, such as those illustrated in FIG. 7(a), the taper angle θt is about 30° and the refractive index $n_3$ is about 3.45. Such configuration of the cladding 704 and the light coupling material 709 may result in more reflective light R2 and power loss due to the use of a high refractive index material for the light coupling material 709. It may also result in more total internally reflected light (e.g., R1→R7→R3) and more scattered light (e.g., R5, R6) at edges of the side surface of the waveguide 703 that do not enter the waveguide 703 given the high taper angle θt, such that the internally reflected light cannot enter the waveguide 703 effectively. Less light may travel through R1→R2s→R4 and enter the waveguide 703 along the surface.

Figure 7B:
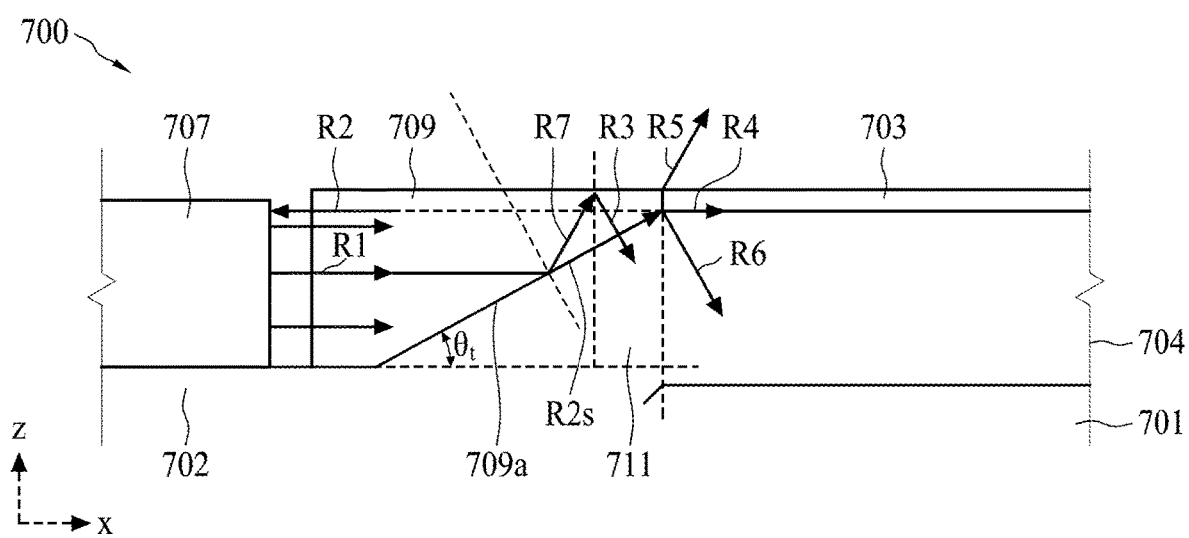
FIG. 7(b) illustrates a cross-sectional view of an example device according to an embodiment of the present disclosure.

FIG. 7(b) illustrates a cross-sectional view of a device 700 according to an embodiment of the present disclosure. The semiconductor package 700 is similar to that illustrated in FIG. 7(a), with a difference including that the refractive index $n_3$ of the light coupling material 709 may be different from that of the light coupling material 709 of the device of FIG. 7(a) and is lowered to about 2.23. Such configuration of the cladding 704 and the light coupling material 709 may result in less reflective light R2 and more scattered light R4, R5, R6 at edges of the side surface of the waveguide 703 compared to that of FIG. 7(a), due to less total internal reflections. Less light may travel through R1→R2s→R4 and enter the waveguide 703 along the surface.

Figure 7C:
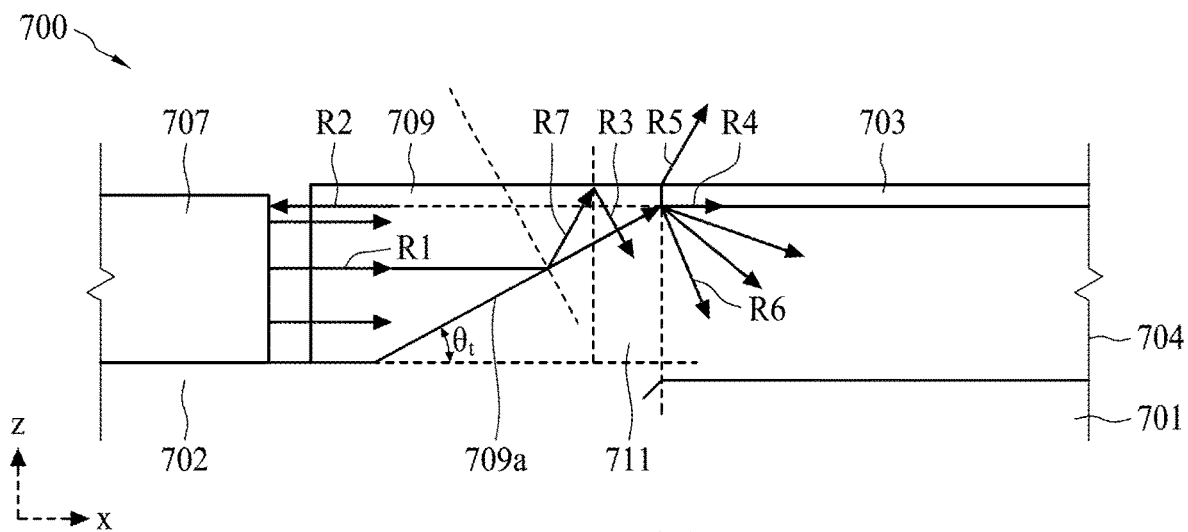
FIG. 7(c) illustrates a cross-sectional view of an example device according to an embodiment of the present disclosure.

FIG. 7(c) illustrates a cross-sectional view of a device 700 according to an embodiment of the present disclosure. The semiconductor package 700 is similar to that illustrated in FIG. 7(b), with a difference including that the refractive index $n_3$ of the light coupling material 709 may be different from that of the light coupling material 709 of the device of FIG. 7(b) and is further lowered to about 1.65. Such configuration of the cladding 704 and the light coupling material 709 may result in less reflective light R2 and more scattered light R4, R5, R6 at the edges of the side surface of the waveguide 703 compared to that of FIG. 7(b) as the taper angle required for the total internal reflection is smaller. Given the above, it is has been found that the reduction of scattered light R6 is not linearly related to the decrease of the refractive index of the light coupling material 709. It is therefore preferable to select a light coupling material 709 having a refractive index between about 2 and about 2.5 to improve the light coupling efficiency.

Figure 8A:
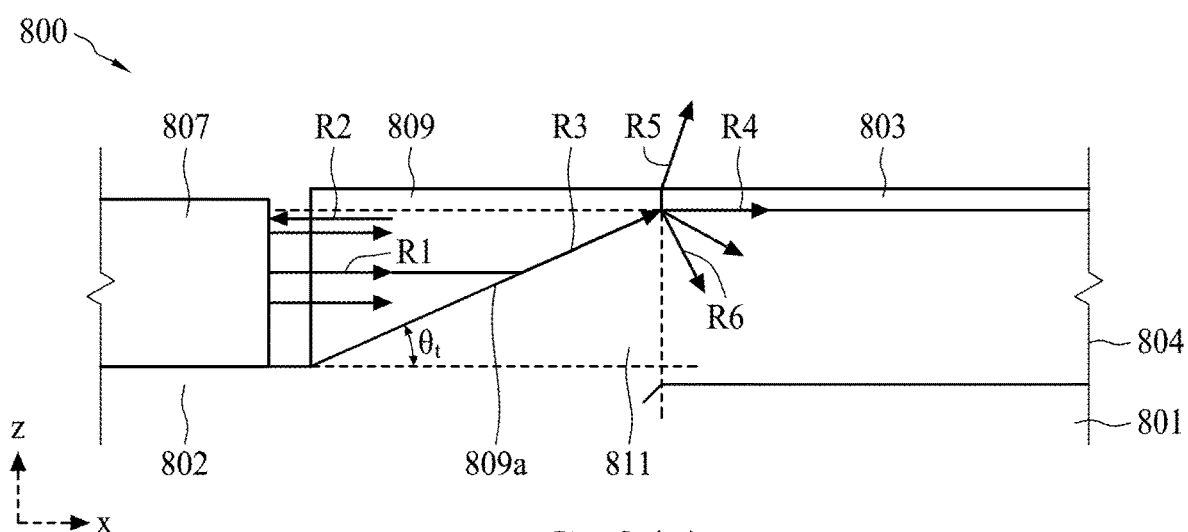
FIG. 8(a) illustrates a cross-sectional view of an example device according to an embodiment of the present disclosure.

FIG. 8(a) illustrates a cross-sectional view of a device 800 according to an embodiment of the present disclosure. The semiconductor package 800 is similar to that illustrated in FIG. 7(a), with a difference including that the taper angle θt of the second portion 811 of the cladding 804 may be different from that of the second portion 711 of the cladding 704, which is lowered to 10°. Such configuration of the cladding 804 and the light coupling material 809 may result in more reflective light R2 and less scattered light R4, R5, R6 at the edges of the side surface of the waveguide 803 due to more total internal reflections, such that more total internally reflected light transmits along with the surface 809*a* compared to that of FIG. 7(*a*).

Figure 8B:
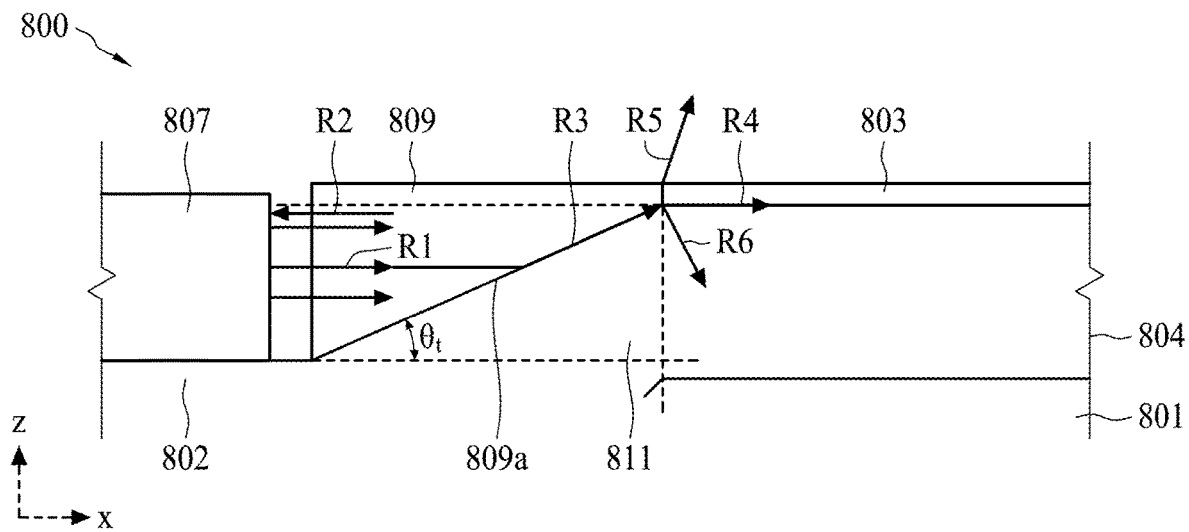
FIG. 8(b) illustrates a cross-sectional view of an example device according to an embodiment of the present disclosure.
Figure 8C:
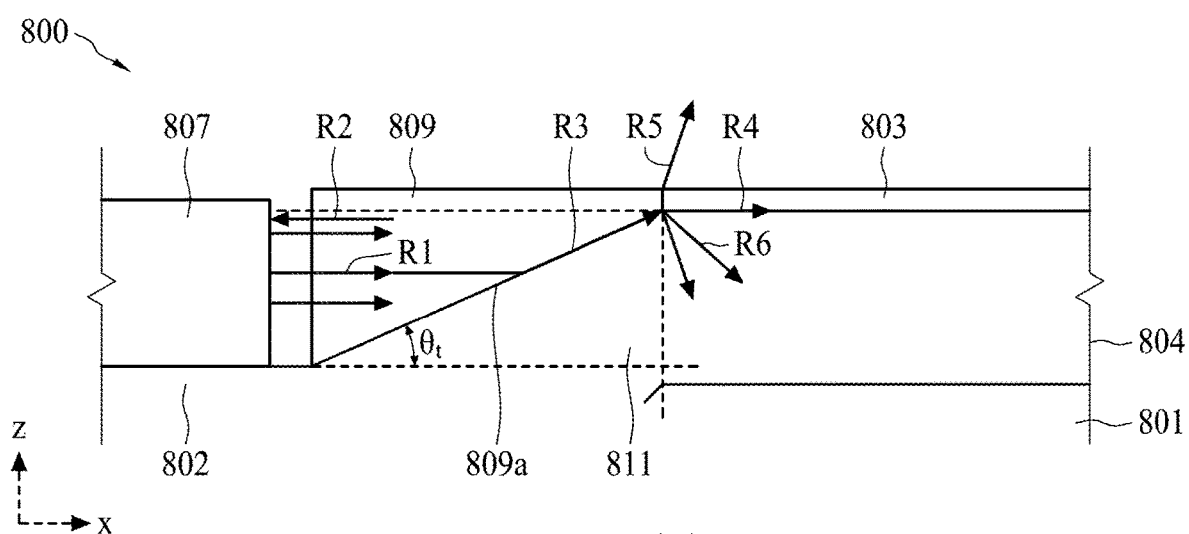
FIG. 8(c) illustrates a cross-sectional view of an example device according to an embodiment of the present disclosure.

FIG. 8(*b*) illustrates a cross-sectional view of a device 800 according to an embodiment of the present disclosure. The semiconductor package 800 is similar to that illustrated in FIG. 8(*a*), with a difference including that the refractive index $n_3$ of the light coupling material 809 may be different from that of the light coupling material 809 of the device of FIG. 8(*a*) and is reduced to about 2.23. Such configurations of the cladding 804 and the light coupling material 809 may result in less reflective light R2 and less scattered light R4, R5, R6 at the edges of the side surface of the waveguide 803 due to more total internally reflected light R3 transmitting along with the surface 809*a* compared to that of FIG. 8(*a*). In addition, such configuration of the cladding 804 and the light coupling material 809 may result in less refractive light compared to that of FIG. 7(*b*) as the taper angle θt of the second portion 811 of the cladding 804 is lowered to 10°.

FIG. 8(*c*) illustrates a cross-sectional view of a device 800 according to an embodiment of the present disclosure. The semiconductor package 800 is similar to that illustrated in FIG. 8(*b*), with a difference including that the refractive index $n_3$ of the light coupling material 809 may be different from that of the light coupling material 809 of the device of FIG. 8(*b*) and is further reduced to about 1.65. Such configurations of the cladding 804 and the light coupling material 809 may result in less reflective light R2 and more scattered light R4, R5, R6 at the edges of the side surface of the waveguide 703 compared to that of FIG. 8(*b*) as the taper angle required for the total internal reflection is smaller. As stated above, it has been found that it is preferable to select a light coupling material 809 having a refractive index between 2 and 2.5 to improve the light coupling efficiency. In addition, such configuration of the cladding 804 and the light coupling material 809 may result in less refractive light and less scattered light compared to that of FIG. 7(*c*) as the taper angle θt of the second portion 811 of the cladding 804 is lowered to 10°.

Figure 9:
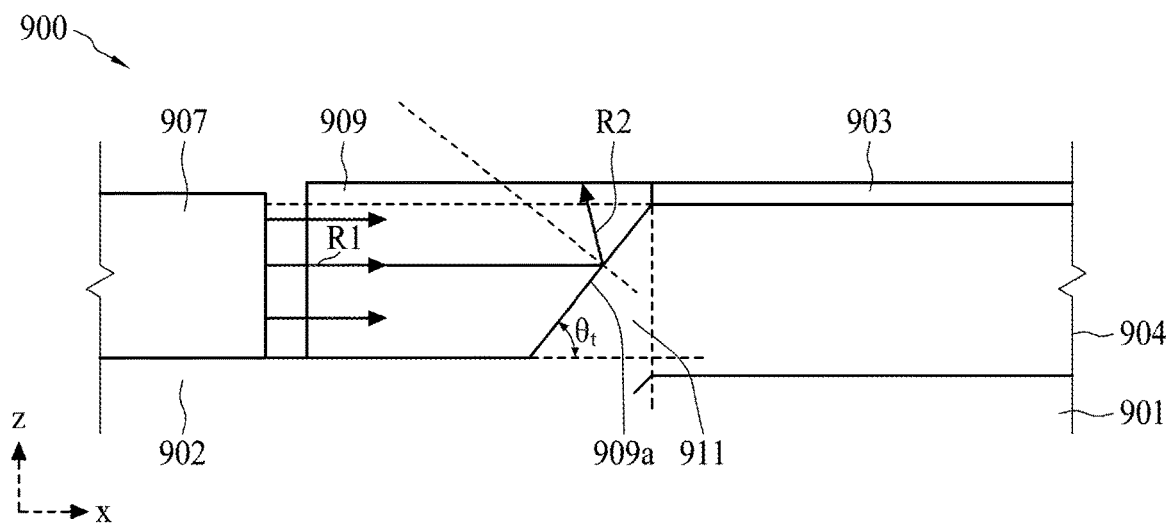
FIG. 9 illustrates a cross-sectional view of an example device according to an embodiment of the present disclosure.

FIG. 9 illustrates a cross-sectional view of a device 900 according to an embodiment of the present disclosure. The semiconductor package 900 is similar to that illustrated in FIG. 7(*a*), with a difference including that the taper angle θt of the second portion 911 of the cladding 904 may be different from that of the second portion 711 of the cladding 704 and is raised to 65°. As shown in FIG. 9, such configuration of the cladding 904 and the light coupling material 909 may result in more refractive light R2 that does not enter the waveguide 903 compared to that of FIG. 7(*a*).

Figure 10:
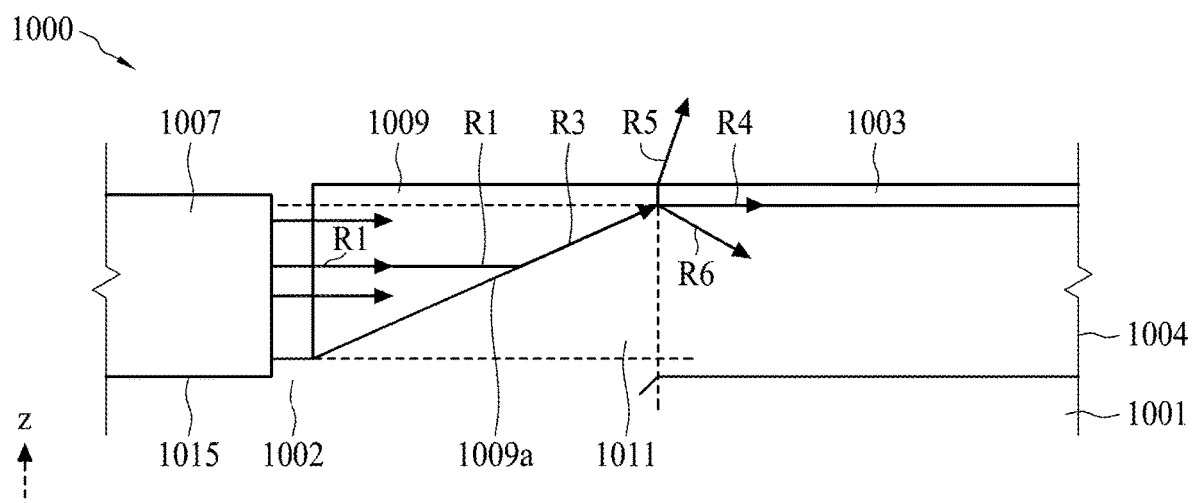
FIG. 10 illustrates a cross-sectional view of an example device according to an embodiment of the present disclosure.

FIG. 10 illustrates a cross-sectional view of a device 1000 according to an embodiment of the present disclosure. The semiconductor package 1000 is similar to that illustrated in FIG. 2(*a*), with a difference including that the third portion 1002 of the cladding 1004 may further include a trench 1015 for disposing the light emitting element 1007. Such trench 1015 may further improve the light coupling efficiency by reducing the occurrence of tilt of the light emitting element 1007 by restricting movement of the light emitting element 1007 in a y-axis direction.

FIGS. 11A-11H illustrate an example method for manufacturing a device according to an embodiment of the present disclosure.

Figure 11A:
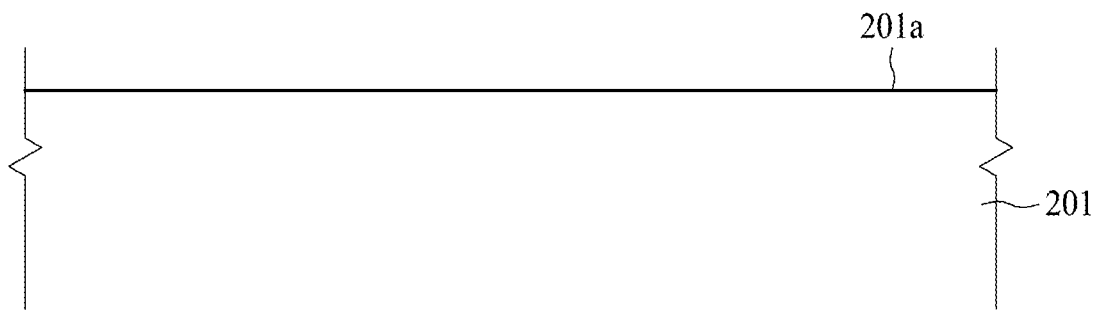
FIG. 11A, FIG. 11B, FIG. 11C, FIG. 11D, FIG. 11E, and FIG. 11F illustrate an example method for manufacturing a device according to an embodiment of the present disclosure.

Referring to FIG. 11A, a substrate 201 is provided. The substrate 201 has a surface 201*a*. The substrate 201 may include silicon, high resistive silicon (undoped silicon), or other suitable materials.

Figure 11B:
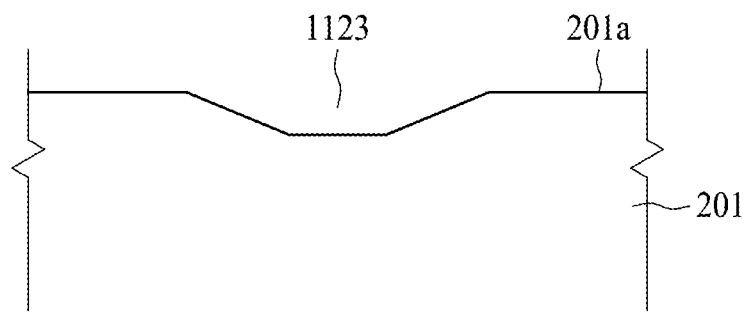

Referring to FIG. 11B, a trench 1123 is formed at the surface 201*a* of the substrate 201. In some embodiments, a photolithography process and an etching process are performed to remove a predetermined portion of the substrate 201 to form the trench 1123.

Figure 11C:
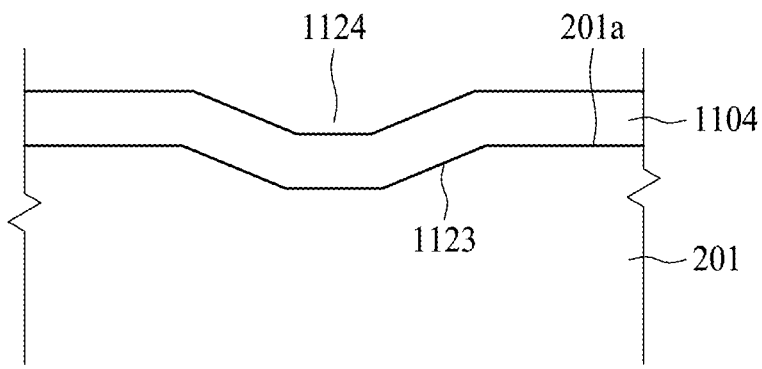

Referring to FIG. 11C, an oxide layer 1104 is disposed over the surface 201*a* of the substrate 201 and in the trench 1123 and define an opening 1124 in the trench 1123. The oxide layer 1104 may be disposed by a chemical vapor deposition technique or other suitable techniques.

Figure 11D:
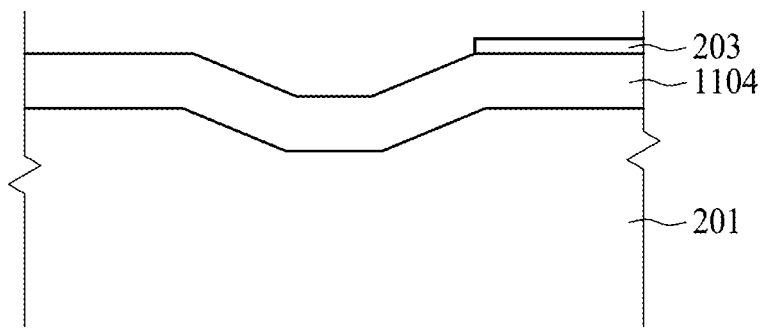

Referring to FIG. 11D, a waveguide 203 is disposed on the oxide layer 1104. The waveguide 203 may be disposed by, for example, a pick and place technique or a bonding technique.

Figure 11E:
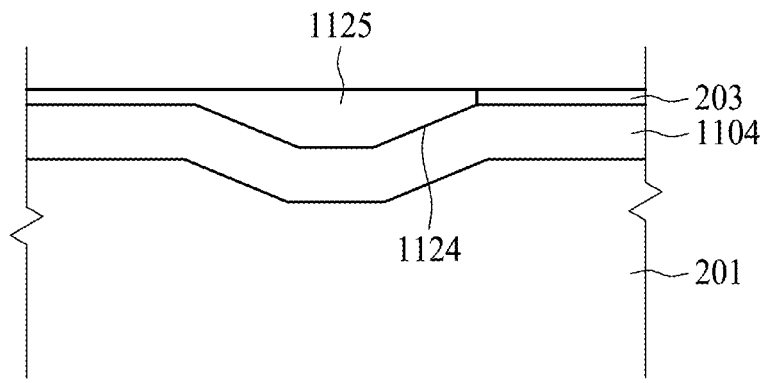

Referring to FIG. 11E, a light coupling material 1125 is disposed in the opening 1124 and in contact with the waveguide 203. The light coupling material 1125 may be disposed by a dispensing technique, a printing technique, or other suitable techniques.

Figure 11F:
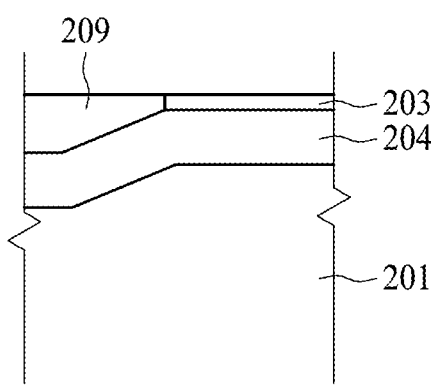

Referring to FIG. 11F, a dicing process is performed by, for example, a sawing technique. Then, a device, such as the one illustrated in FIG. 2(*a*) may be obtained.

FIGS. 12A-12E illustrate an example method for manufacturing a device according to an embodiment of the present disclosure.

Figure 12A:
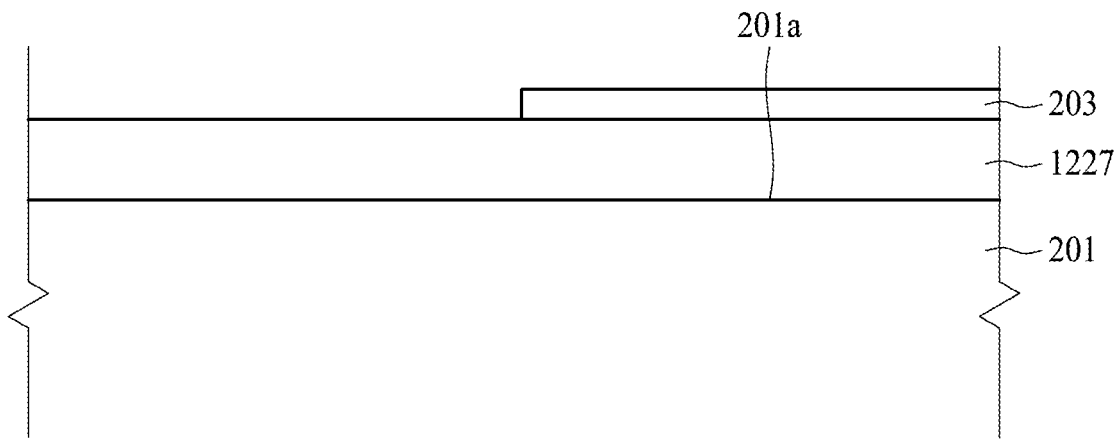
FIG. 12A, FIG. 12B, FIG. 12C, FIG. 12D, and FIG. 12E illustrate an example method for manufacturing a device according to an embodiment of the present disclosure.

Referring to FIG. 12A, a substrate 201 is provided with a dielectric layer 1227 disposed over a surface 201*a* of the substrate 201. A waveguide 203 is provided on the dielectric layer 1227.

Figure 12B:
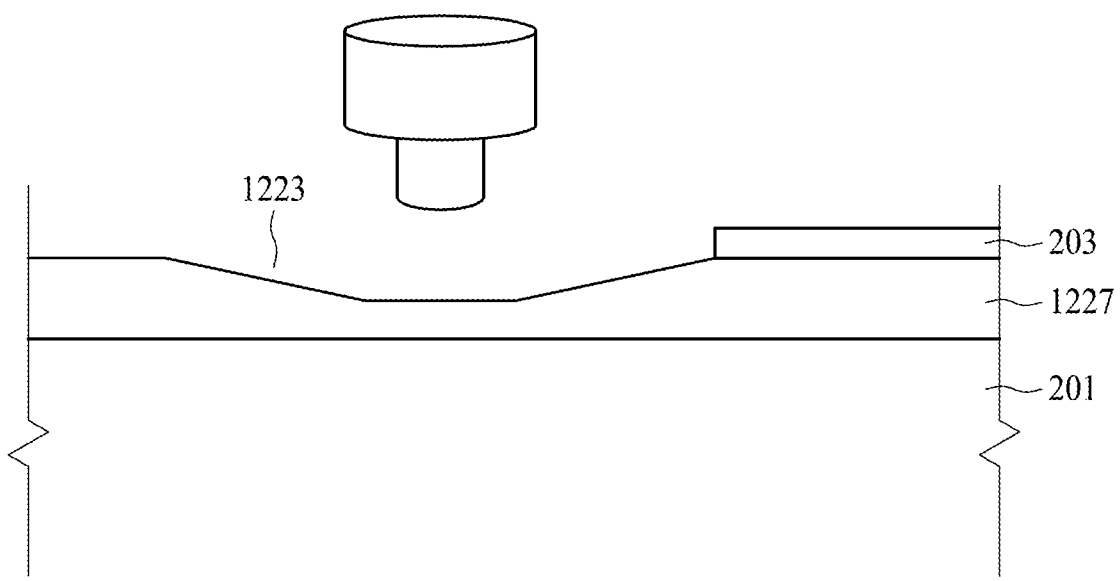

Referring to FIG. 12B, a trench 1223 is formed at the dielectric layer 1227 and adjacent to the waveguide 203. In some embodiments, a laser drilling process is performed to remove a predetermined portion of the dielectric layer 1227 to form the trench 1223.

Figure 12C:
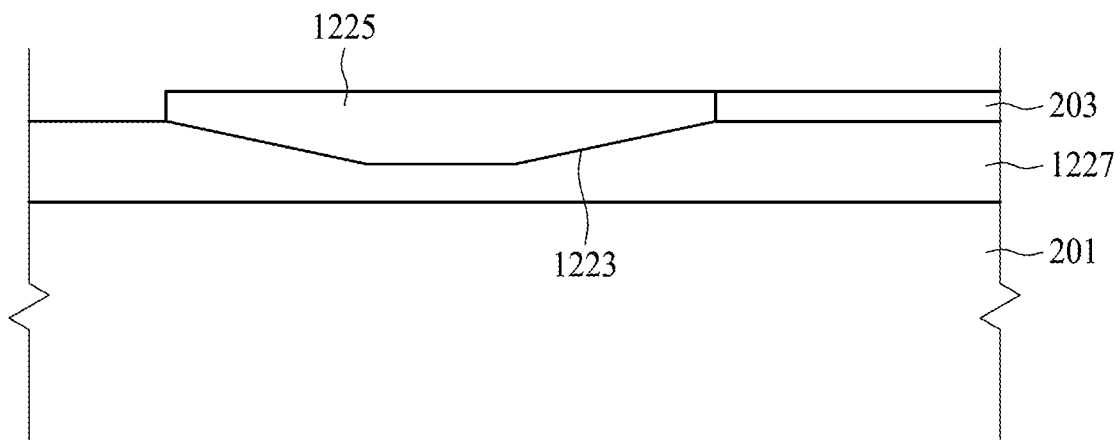

Referring to FIG. 12C, a light coupling material 1225 is disposed in the trench 1223 and in contact with the waveguide 203. The light coupling material 1125 may be disposed by a dispensing technique, a printing technique, or other suitable techniques.

Figure 12D:
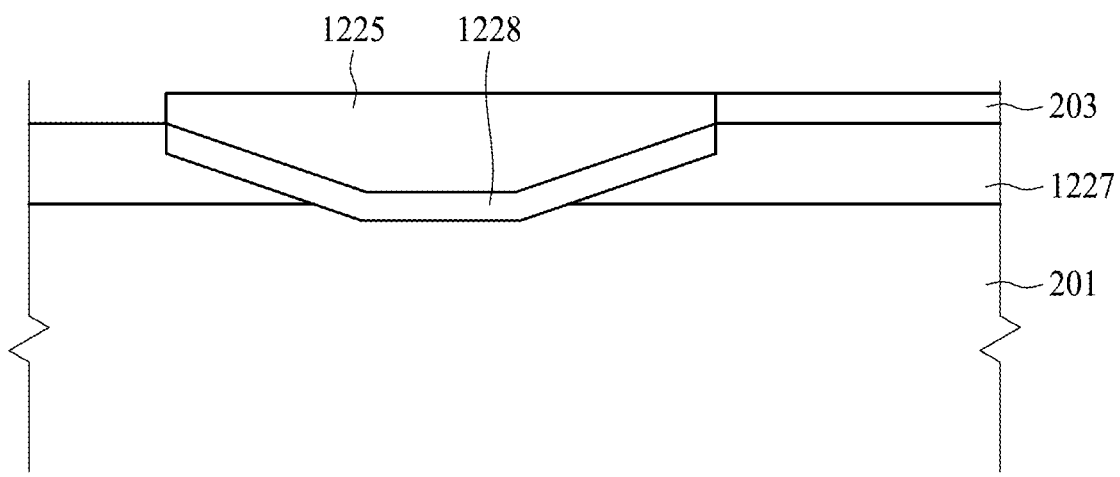

Referring to FIG. 12D, a space 1228 may be formed below the light coupling material 1225 and between the light coupling material 1225 and the substrate 201. The space 1228 may be formed by a combination of a photolithography process and a dry etching process.

Figure 12E:
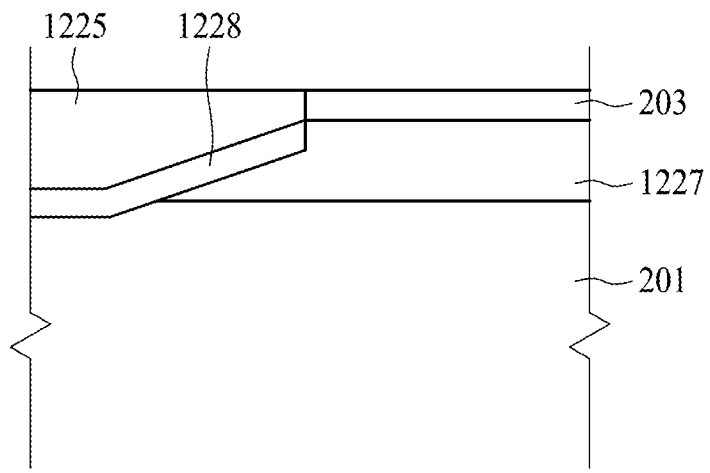

Referring to FIG. 12E, a dicing process is performed by, for example, a sawing technique. Then, a device, such as the one illustrated in FIG. 6 may be obtained.

Figure 13A:
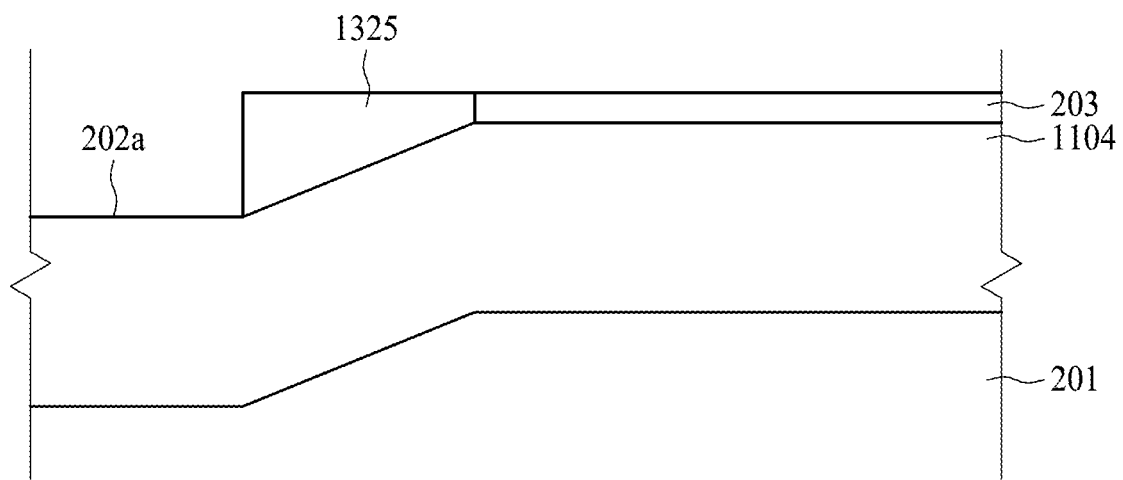
FIG. 13A and FIG. 13B illustrate an example method for manufacturing a device according to an embodiment of the present disclosure.
Figure 13B:
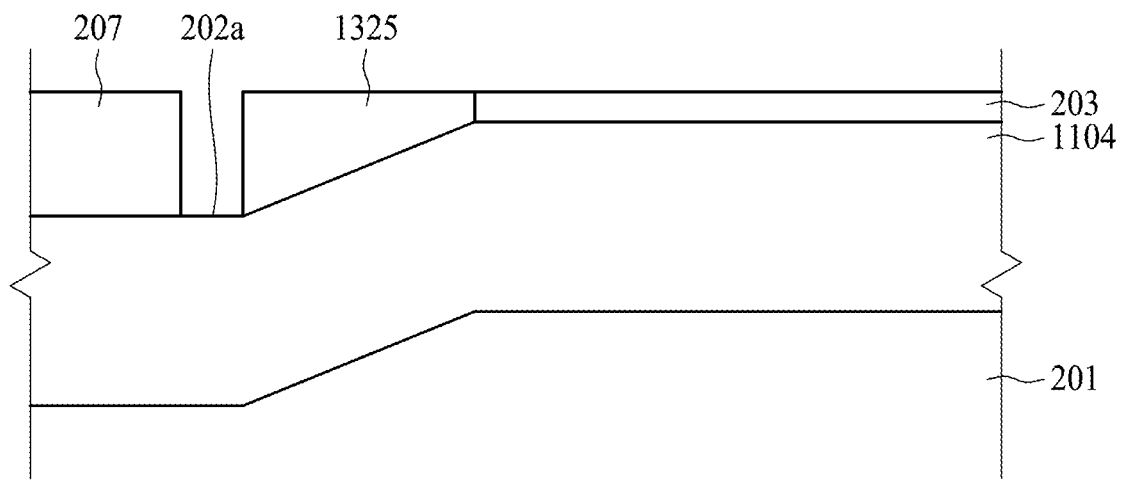

FIGS. 13A-13B illustrate a method for manufacturing a device according to an embodiment of the present disclosure.

Referring to FIG. 13A, which follows the process illustrated in FIG. 11E, a dry etching process may be performed to remove a portion of the light coupling material 1325 until a surface 202*a* of the oxide layer 1104 is exposed and form a space for accommodating a light emitting element.

Referring to FIG. 13B, a light emitting element 207 is disposed on the surface 202*a* of the oxide layer 1104. The light emitting element 207 may be disposed by a pick and place technique.

As used herein and not otherwise defined, the terms "substantially" and "about" are used to describe and account for small variations. When used in conjunction with an event or circumstance, the terms can encompass instances in which the event or circumstance occurs precisely as well as instances in which the event or circumstance occurs to a close approximation. For example, when used in conjunction with a numerical value, the terms can encompass a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. As another example, a line or a plane can be substantially flat if a peak or depression of the line or plane is no greater than 5 µm, no greater than 1 µm, or no greater than 0.5 µm.

As used herein, the singular terms "a," "an," and "the" may include plural referents unless the context clearly dictates otherwise. In the description of some embodiments, a component provided "on or "over" another component can encompass cases where the former component is directly on (e.g., in physical contact with) the later component, as well as cases where one or more intervening components are located between the former component and the latter component.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. The specification and the drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations.

What is claimed is:

1. A device, comprising:
   a waveguide;
   a light coupling material disposed adjacent to the waveguide and having a first surface and a second surface opposite to the first surface, wherein a height of the first surface is less than a height of the second surface, and the waveguide is disposed more adjacent to the first surface than to the second surface;
   a light emitting element, wherein the light coupling material is between the light emitting element and the waveguide, the light emitting element has a lateral surface facing the second surface of the light coupling material, and a height of the lateral surface of the light emitting element is substantially equal to the height of the second surface of the light coupling material from a cross-sectional view perspective.

2. The device of claim 1, wherein the light coupling material further has a slope surface extending from the first surface to the second surface, and the slope surface is free from overlapping the waveguide as viewed in an extending direction of the waveguide.

3. The device of claim 1, wherein the waveguide has a lateral surface facing the first surface of the light coupling material, and a height of the lateral surface of the waveguide is substantially equal to the height of the first surface of the light coupling material from a cross-sectional view perspective.

4. The device of claim 3, wherein a top surface of the light coupling material is substantially level with a top surface of the waveguide, and a bottom surface of the light coupling material is inclined with a bottom surface of the waveguide.

5. The device of claim 4, further comprising a cladding, wherein the cladding has a top surface facing the light coupling material and the waveguide, and a thickness of the cladding increases in a direction from the light coupling material toward the waveguide.

6. The device of claim 5, wherein the cladding further has a bottom surface opposite to the top surface, and a distance between the bottom surface of the cladding and the top surface of the light coupling material is substantially equal to a distance between the bottom surface of the cladding and the top surface of the waveguide.

7. The device of claim 1, wherein the lateral surface of the light emitting element is spaced apart from the second surface of the light coupling material by a distance.

8. The device of claim 1, wherein a top surface of the light emitting element is substantially parallel with a top surface of the light coupling material from the cross-sectional view perspective.

9. A device, comprising:
   a light coupling material having a first surface, a second surface opposite to the first surface, and a slope surface extending from the first surface to the second surface;
   a waveguide disposed adjacent to the first surface of the light coupling material; and
   a light emitting element disposed adjacent to the second surface of the light coupling material, wherein the light emitting element, the light coupling material, and the waveguide are arranged in sequence in an extending direction of the waveguide, wherein
   the slope surface of the light coupling material comprises a first end having a level substantially aligned with a bottom surface of the light emitting element, the slope surface of the light coupling material further comprises a second end, opposite to the first end, and substantially aligned with a bottom surface of the waveguide, the light coupling material further has a top surface extending from the first surface to the second surface, and a top surface of the light emitting element, the top surface of the light coupling material, and a top surface of the waveguide are substantially level with each other.

10. The device of claim 9, wherein the light emitting element at least partially overlaps the waveguide horizontally.

11. The device of claim 9, further comprising a cladding disposed adjacent to the slope surface of the light coupling material.

12. The device of claim 11, wherein the cladding comprises a trench for accommodating the light emitting element.

13. The device of claim 12, further comprising an air gap between the cladding and the light coupling material.

14. The device of claim 13, wherein the slope surface of the light coupling material is free from contacting the cladding.

15. The device of claim 9, wherein the light emitting element has a lateral surface facing and non-parallel to the second surface of the light coupling material.

* * * * *